(12) United States Patent
Geron et al.

(10) Patent No.: US 9,383,522 B2
(45) Date of Patent: Jul. 5, 2016

(54) FIBER BUNDLE

(75) Inventors: Amir Geron, Modi'in (IL); Gideon Katz, Zoran (IL)

(73) Assignee: Compass Electro Optical Systems Ltd., Netanya (IL)

( * ) Notice: Subject to any disclaimer, the term of this patent is extended or adjusted under 35 U.S.C. 154(b) by 629 days.

(21) Appl. No.: 13/279,710

(22) Filed: Oct. 24, 2011

(65) Prior Publication Data

US 2012/0106898 A1 May 3, 2012

Related U.S. Application Data

(60) Provisional application No. 61/406,189, filed on Oct. 25, 2010.

(51) Int. Cl.
*G02B 6/36* (2006.01)
*G02B 6/38* (2006.01)
*G02B 6/44* (2006.01)

(52) U.S. Cl.
CPC ............ *G02B 6/3672* (2013.01); *G02B 6/3644* (2013.01); *G02B 6/3652* (2013.01); *G02B 6/3692* (2013.01); *G02B 6/3885* (2013.01); *G02B 6/4472* (2013.01); *Y10T 29/49826* (2015.01); *Y10T 29/53* (2015.01)

(58) Field of Classification Search
None
See application file for complete search history.

(56) References Cited

U.S. PATENT DOCUMENTS

| | | | |
|---|---|---|---|
| D449,275 S | 10/2001 | Goto | |
| 6,522,817 B2* | 2/2003 | Moran | G02B 6/362 29/850 |
| 6,609,835 B2* | 8/2003 | Trezza et al. | 385/65 |
| 6,633,719 B2* | 10/2003 | Basavanhally | G02B 6/3644 385/137 |
| 6,704,483 B2 | 3/2004 | Sherman et al. | |
| 6,757,475 B2 | 6/2004 | Sherman et al. | |
| 6,766,086 B1 | 7/2004 | Sherman et al. | |
| 6,823,127 B2* | 11/2004 | Nasiri et al. | 385/137 |
| D519,085 S | 4/2006 | Gull et al. | |
| 7,024,090 B2* | 4/2006 | Jeantilus | G02B 6/3644 385/137 |
| 7,149,400 B2* | 12/2006 | Lange et al. | 385/137 |
| 7,167,618 B2* | 1/2007 | Kobayashi | G02B 6/32 385/115 |
| 7,521,634 B2 | 4/2009 | Clem et al. | |
| 7,606,454 B2* | 10/2009 | Furusawa | G02B 6/3582 385/120 |
| 2012/0106898 A1 | 5/2012 | Geron et al. | |

* cited by examiner

*Primary Examiner* — John M Bedtelyon
(74) *Attorney, Agent, or Firm* — Wilmer Cutler Pickering Hale and Dorr LLP

(57) ABSTRACT

A fiber optic bundle including a coupler and a large matrix of fibers assembled from optical ribbons positioned very accurately in the coupler. Preferably, the coupler includes at least two plates, most preferably silicon plates, with a plurality of fiber receiving guides etched therethrough.

22 Claims, 4 Drawing Sheets

$$\alpha = \arcsin \frac{D}{\sqrt{D^2+L^2}} - \arcsin \frac{d}{\sqrt{D^2+L^2}}$$

IF $D-d < d$ AND $10D < L$ $$\alpha \approx \frac{D-d}{L}$$

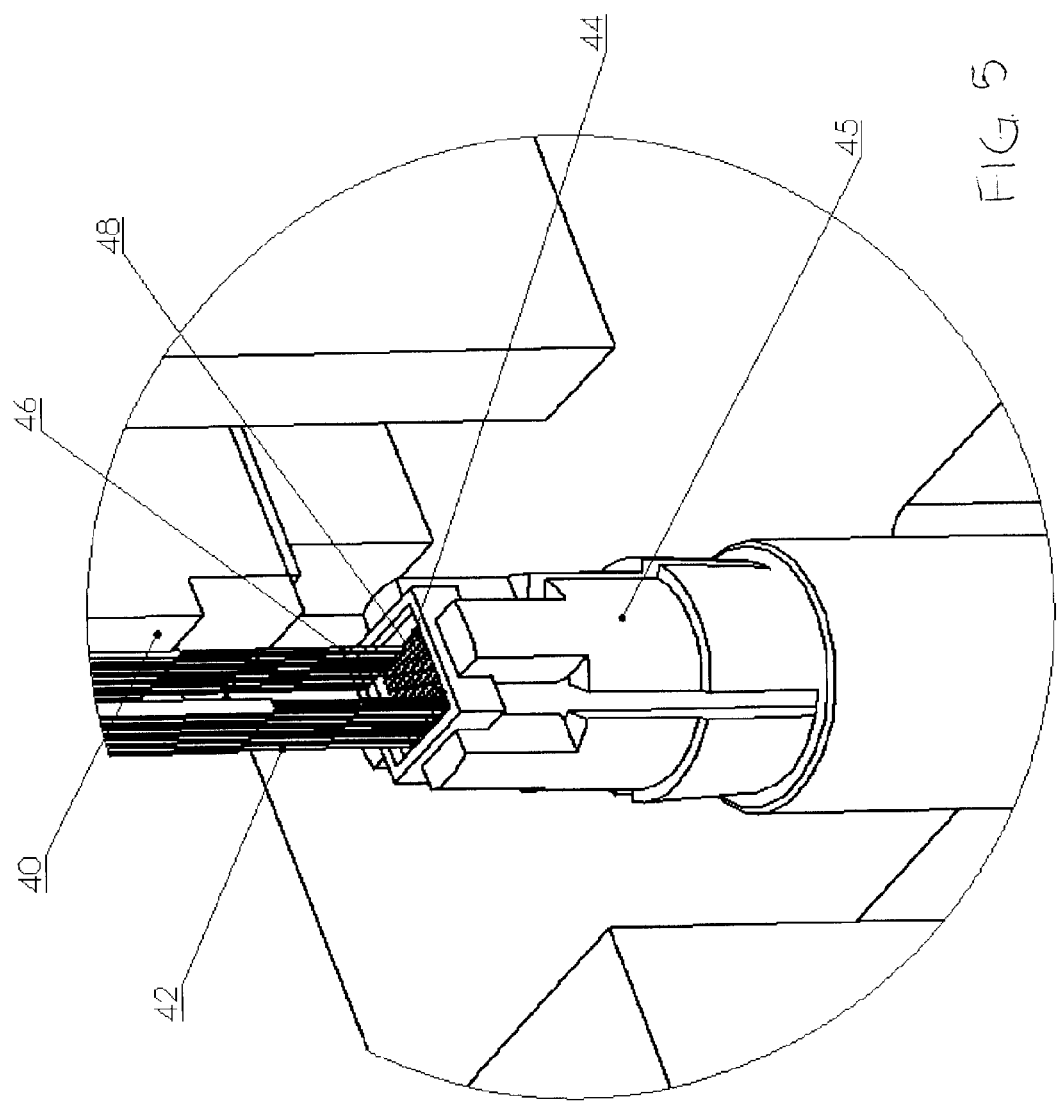

FIBER BUNDLE

CROSS-REFERENCE TO RELATED APPLICATIONS

The present invention claims priority under 35 U.S.C. §119 (e) to U.S. Provisional Application No. 61/406,189 filed on Oct. 25, 2010, entitled "Fiber Bundle," incorporated herein by reference in its entirety.

FIELD OF THE INVENTION

The present invention relates to a fiber bundle for optical fibers, in general and, in particular, to a fiber bundle in the form of ribbons and a method of forming it.

BACKGROUND OF THE INVENTION

Ribbons of fibers are the natural way to handle a large number of fibers. (The number can vary from a few to a few dozens). Ribbons are commonly used in fiber communication since the fibers are densely connected and there are standard connectors that can be coupled to them. The use of ribbons is the natural solution for back plane connectors, where high density connectivity and a large number of fibers are required. Usually bundles are made from single fibers and then assembled (at least at one end) in ribbons to fit the standard connectors With the growing demand for bandwidth, the active optical components, such as optical sources and photo-receivers, were produced and used in the form of matrices of N×M elements. This is particularly true for VCSEL matrices and matrices of photodiodes. In other words, arrays of optical fibers must be coupled precisely and reliably to semiconductor lasers and detector arrays on a chip. In this context, there is a great demand for optical fiber bundles in general and for bundles made from ribbons, in particular, as well as for a reliable and efficient method of producing such bundles.

In U.S. Pat. No. 6,704,483 to Sherman, a method for creating an accurate fiber array from individual optical fibers is described. The method includes removing the fiber jackets and buffer layers of each fiber and shaping the stripped fiber tips to a conical shape. A special tool to hold the fibers is required. The conical tips are inserted through a guide plate until they reach the end and can be inserted through mask holes where they are affixed in silicon or epoxy. This method requires extreme precision of hole centers in the silicon wafer—typically a tenth of a micron for 120-200 micron holes.

This method is not suitable when using a fiber ribbon since all the fibers in a ribbon are connected together, so that stripping and making a conic end for each of them separately would require the ribbon to be disassembled, thereby taking away all the advantages of ribbons. Furthermore, while a few fibers can be inserted simultaneously, this solution requires a series of guide plates inside the housing. This would not work with ribbons, which have low precision for each fiber in their jackets and even stripped. This means, when putting such ribbon fibers in holes, some of the fibers would be stopped/stacked in the hole before the end, while the rest of the fibers would be floating, not reaching the end of the plate, and thus will not get the accuracy needed for assembly.

U.S. Pat. No. 6,766,086, also to Sherman, describes a method of engagement of individual fibers used to achieve precise placement in a fiber array housing. This involves at least one movable arm or clamp attached to the mask on the housing for pressing the fiber against the side walls of the fiber seating openings in the mask.

U.S. Pat. No. 6,757,475, also to Sherman, describes a method of making an etchable wafer substrate for use in making optical fiber array plates including forming a series of metrology holes at one or more locations of the wafer. When the wafer is preliminarily completed, the variation between designed plate hole diameter and the actual plate hole diameter is determined, by using a probe known to be of the desired diameter. Corrective action can be taken before the wafer ships, e.g., the size of the various holes can then be adjusted accordingly, thereby permitting manufacturers to know the precise hole size without the use of optical instruments.

Accordingly, there is a long felt need for a method for creating a bundle of fiber ribbons, and it would be very desirable if there were precise positioning of each of the fibers from each ribbon.

SUMMARY OF THE INVENTION

The invention relates to a large fiber optic array (called a "bundle"), more particularly a large matrix of fibers positioned in a very accurate manner, that is assembled from optical fiber ribbons. This is accomplished by providing a support for one or more optical fiber ribbons while coupling its optical fibers to an optical ribbon connector for forming the bundle. In this way, all the fibers in the entire ribbon can be placed in the connector at the same time, thereby saving time and providing accurate placement.

There is provided according to the present invention a fiber optic bundle including a coupler and a large matrix of fibers assembled from optical ribbons positioned very accurately in the coupler. Preferably, the coupler includes at least two plates with a plurality of fiber receiving guides etched therethrough. Most preferably, the plates are formed of silicon.

There is further provided, according to the present invention, a method for forming a fiber bundle, the method including providing a connector for holding a plurality of optical ribbons, each including a row of optical fibers, placing at least one optical ribbon on a support with the stripped fibers protruding from the end of the support, holding the support adjacent to a desired row of fiber receiving guides in the connector and inserting all the optical fibers in the ribbon into the connector substantially simultaneously.

There is also provided, according to the invention, apparatus for forming a fiber bundle, the apparatus including a plurality of optical ribbons, each including a row of optical fibers, a coupler for holding the plurality of ribbons substantially in parallel to one another, and a support for holding at least one of the ribbons adjacent to the connector during insertion of the ribbon into the connector to permit insertion of all the optical fibers in the ribbon into the connector substantially simultaneously.

BRIEF DESCRIPTION OF THE DRAWINGS

The present invention will be further understood and appreciated from the following detailed description taken in conjunction with the drawings in which:

FIG. 5 is a plan view of a device for forming a fiber bundle, according to one embodiment of the invention.

DETAILED DESCRIPTION OF THE INVENTION

The present invention relates to a large fiber optic array (called a bundle), more particularly a large matrix of optical fibers positioned in a very accurate manner, that is assembled from optical fiber ribbons. This bundle can be used in communication, for connection between fibers and optical components, for connection between fibers and each other (connector), and for connection between fibers and electro-optical components connected to driving electronics.

Figure 1:
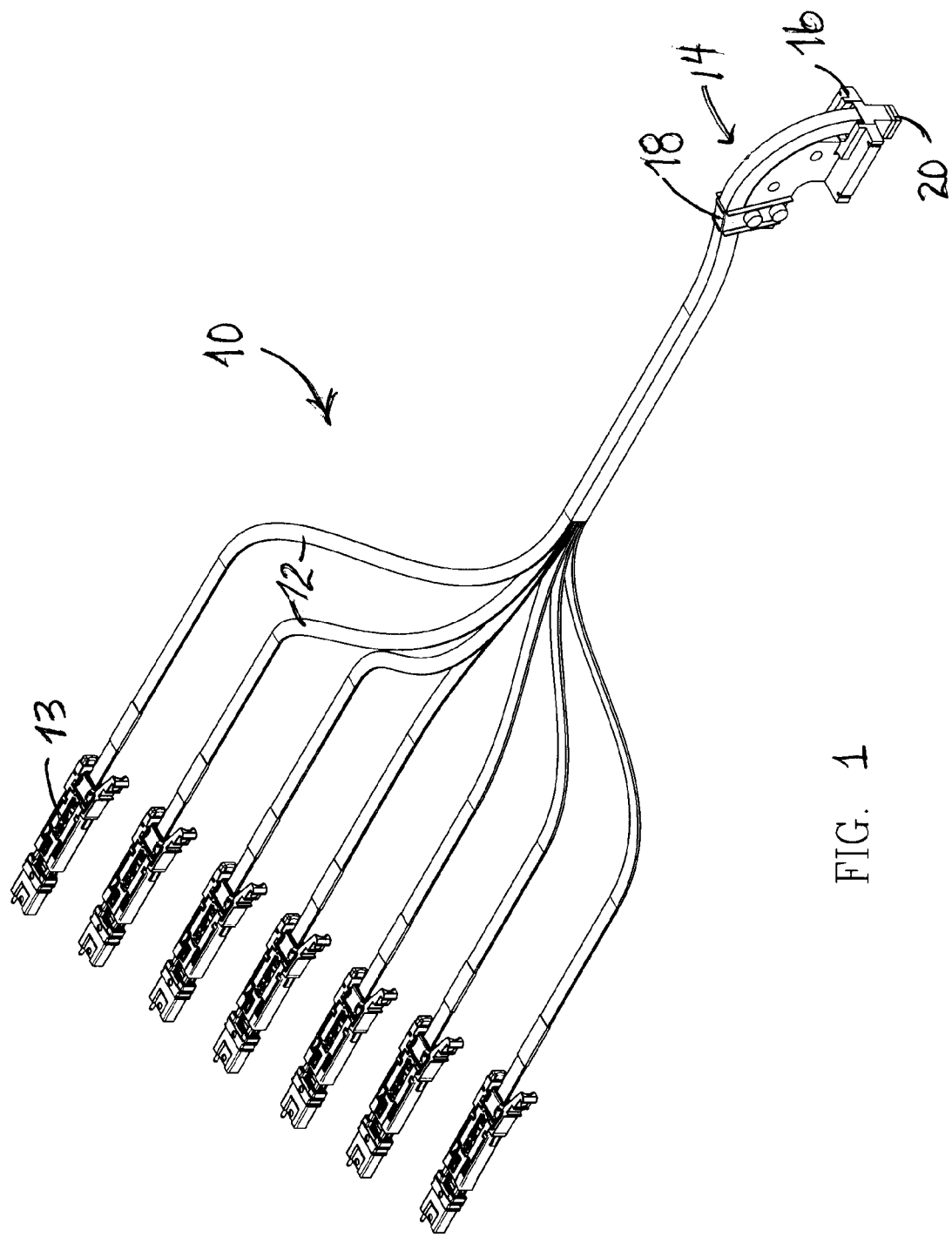
FIG. 1 is a perspective illustration of an optical fiber bundle constructed and operative in accordance with one embodiment of the present invention.
Figure 2:
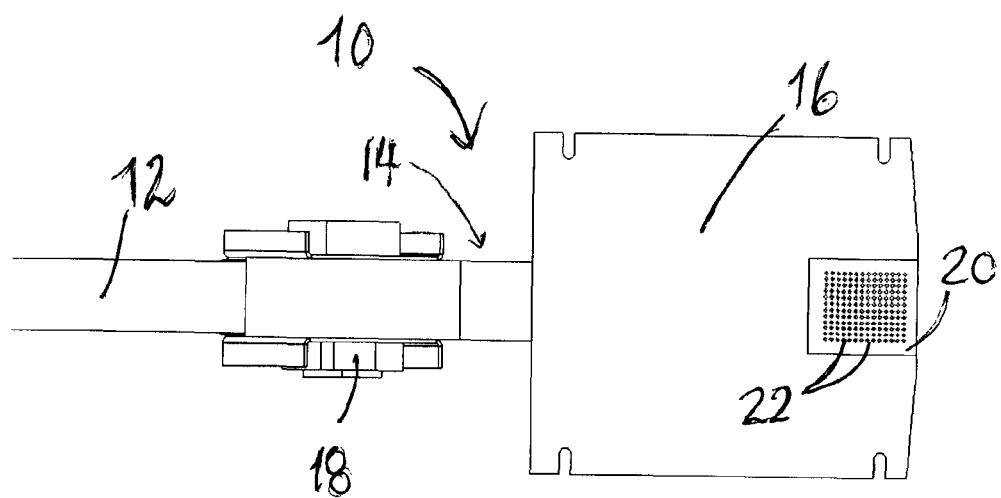
FIG. 2 is a bottom view of a coupled for use in a fiber bundle, according to one embodiment of the invention.

As shown in FIGS. 1 and 2, perspective and bottom views, respectively, of a fiber bundle constructed and operative in accordance with embodiments of the present invention, the bundle 10 is built from a plurality of fiber optic ribbons 12, each including a row of optical fibers (not shown). For example, each ribbon can be constructed from 12, 24, 36 fibers. A conventional connector 13 can be attached to one end of each fiber optic ribbon. The other ends of fiber optic ribbons 12 are mounted in a fiber ribbon connector 14 having a housing 16, a ribbons clamp 18 and at least two plates 20. Preferably, plates 20 are formed of silicon. The accuracy of the fiber array in terms of placement, pitch and angle in the plates 20 is achieved by using a structure including a plurality of plates. According to a preferred embodiment of the invention, the plates are silicon plates produced from a Si wafer. These plates are made by means of microelectronic manufacturing, and preferably the holes or guides are drilled in the plates on the wafer by an etching process which is very accurate in positioning and dimensions, preferably by a Deep Reactive-Ion Etch (DRIE) process. Silicon plates 20 may be diced from a silicon wafer and an array of fiber receiving guides 22 is formed therein. Fiber receiving guides 22 provide the proper placement, in terms of pitch and angle, for the optical fibers mounted therein, as described in detail below.

Figure 3:
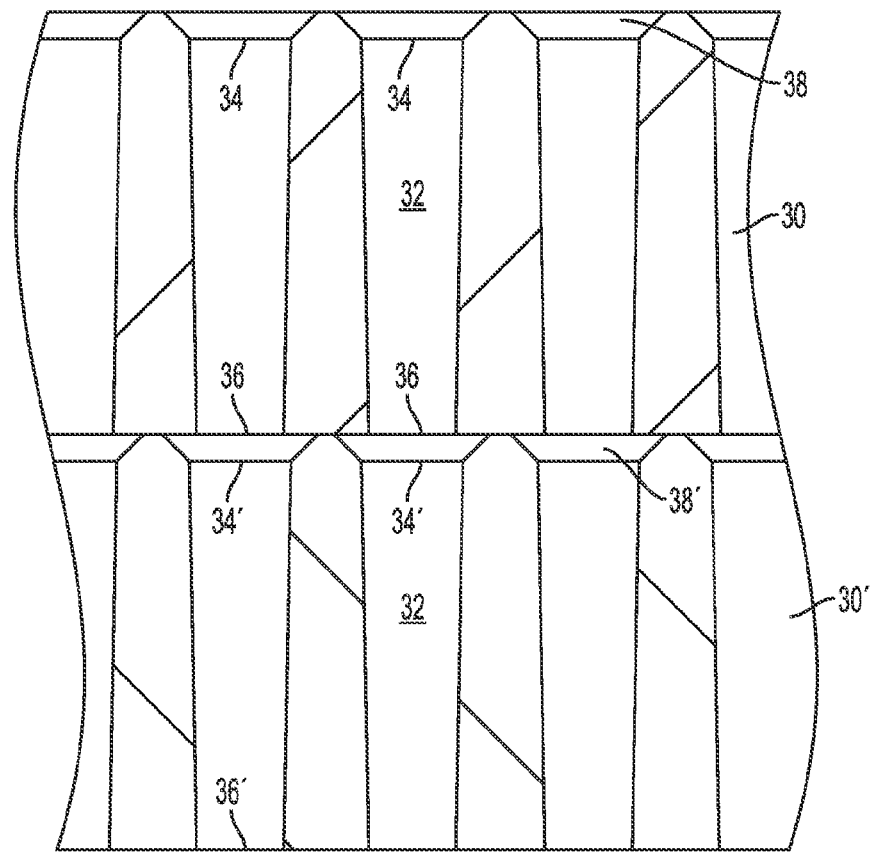
FIG. 3 is a cross sectional view of a silicon plate, according to one embodiment of the invention.

With reference to FIG. 3, there is shown a cross-sectional view of a pair of plates 30, 30' constructed and operative in accordance with one embodiment of the invention. Plates 30 and 30' are substantially identical and are disposed, contacting one another, with fiber receiving guides 32 in registration with one another. Each of the fiber receiving guides 32 is slightly conically shaped, with the top opening 34 being of somewhat larger diameter than the output opening 36. At the upper end of each fiber receiving guide 32, a chamfer 38, 38' is made in order to insert all the fibers of a ribbon together and simultaneously. Insertion of a whole ribbon of fibers at one time can significantly decrease and simplify the bundle assembly process.

Figure 4:
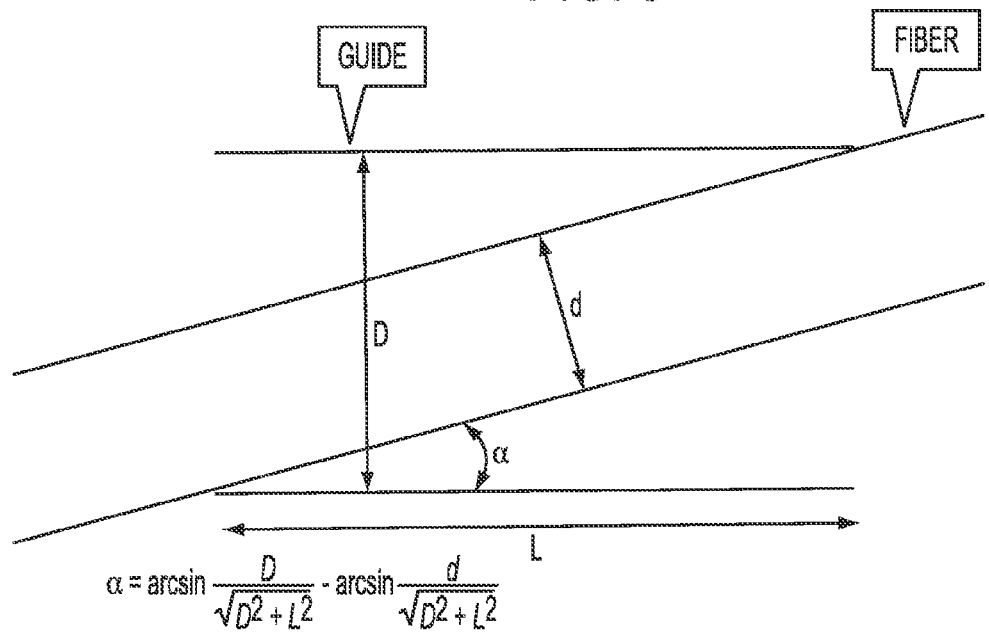
FIG. 4 is a schematic illustration of fiber output angle as a function of hold length and diameter, according to the invention.

A built-in tolerance in the diameter of each guide hole relative to the diameter of the fiber is introduced in the etching process as a small angle α, shown in FIG. 4. However, this angle is problematic in that it can create an undesirable output fiber angle of the fibers. In order to compensate for that angle, the present invention uses at least two plates 30, 30' that are seated one on top of the other. The position of the two (or more) plates relative to each other can be adjusted by the fibers themselves. When inserting the fibers through both plates, the plates become substantially aligned in respect to each other.

As can be seen in FIG. 3, the two plates 30, 30' are similar. When a fiber is inserted into top opening 34, placed in the middle of a guide 32, it passes through both of the plates 30, 30' to the output opening 36' of the second plate. Two of the most important parameters in the bundle are guide pitch and output fiber angle. Each of them has a direct impact on bundle coupling efficiency to connect different optical components.

According to the present invention, the use of two substantially identical guides in registration in at least two plates, placed serially, helps to keep the precision of the placement in the required range. Actually, the guide diameter is bigger (by about 2-3 microns) than the outer diameter of the ribbon fibers to be mounted therein. This means, actual placement of fibers will have a deviation of about 2-3 microns, for a fiber of about 124-127 microns diameter. This deviation has very small impact on coupling efficiency (less than 1%) and can be corrected further by using lenses on the end of the fiber or on the surface of a connected optical device (source or detector). The output angle is much more difficult to correct and has a bigger impact on coupling efficiency.

The coupling efficiency between a bundle and optical elements, such as photodiodes or optical sources, depends on many parameters—distance, light divergence, fiber misalignment inside the bundle, etc. One important parameter is angle alignment between the longitudinal axes of the fibers and the perpendicular direction to the surface of the optical elements mentioned above. As the angle (misalignment) between the optical axes of the fibers and the direction orthogonal to the surface of the optical elements approaches 0 degrees, the coupling efficiency increases.

In this regard, the fiber misalignment angle is approximately proportional to the ratio of the difference (D−d) between guide diameter D and fiber diameters d and guide length L. In other words, to provide better alignment, one should reduce the diameter D of the guide (since a guide diameter closer to the fiber diameter d leads to a smaller ratio) or/and increase guide length L. In short, this means a longer and thinner guide provides better fiber alignment.

This relationship is illustrated on FIG. 4. In order to provide the exact required precision of output fiber angle, the length of the guides 32, defined by the thickness of two (or more) connected plates, is chosen, as explained in FIG. 4, an illustration of fiber output angle as a function of guide length L and guide diameter D. The fiber diameter d is measured, and plates with guide having a diameter a few microns bigger than d are used to assemble the bundle. The plate thickness, which is equal to guide length L, is chosen according to the following equations:

$$a = \arcsin \frac{D}{\sqrt{D^2 + L^2}} - \arcsin \frac{d}{\sqrt{D^2 + L^2}}$$

If D−d≪d and 10D≪L $$a \approx \frac{D-d}{L}$$

When plates with the proper thickness are chosen, the fibers are placed very close to the center of the holes and have an output angle in the range according to the required precision.

It is a particular feature of the invention that this method and structure are suitable for making a bundle of ribbons even though, in each ribbon, the fibers have slightly different diameters and there are various diameter numbers for different ribbons. Unlike the prior art, it is not necessary to make precise guide holes matching each fiber.

The present invention utilizes a support device 40, shown in FIG. 5, to hold one or more fiber optic ribbons 42 during the process of mounting the ribbon in the plates 44. The plates may be held in a clamp 45. In the illustrated embodiment, several ribbons 42' have already been mounted in plates 44. A next ribbon 42 is prepared for mounting by stripping the ends of the fibers. The ribbon is mounted in support device 40, and the support device 40 is moved closer to the plates 44. According to a preferred embodiment, support device 40 includes a plurality of V-shaped or other grooves (not shown) to align and support the fibers. When the stripped optical fibers 46 in the ribbon 42 are aligned over the selected row of fiber receiving guides 48, the support lowers the ribbon 42 towards the plates until the fibers enter the chamfers at the opening of each of the fiber receiving guides 48. The support continues to lower ribbon 42 until the fibers pass through the associated guides in both plates until the optical fibers reach the output (seen in FIG. 3), at which time, the support releases ribbon 42. The ribbons and the fibers are now glued in place by inserting adhesive, e.g., epoxy, into guides 48 around the fibers. After gluing the ends of the fibers are cut and polished. A lens may be provided for each fiber to get optimal performance.

It will be appreciated that, alternatively, a support device can be provided which holds a plurality of ribbons with their fibers in suitable alignment for inserting substantially simultaneously into the fiber receiving guides.

It will further be appreciated that physical retention elements to hold the fibers in the fiber receiving guides are not needed in the present apparatus, since fiber placement accuracy preferably is provided by means of the DRIE process and, in that way, stresses are not applied on the fibers.

Referring, once again, to FIG. 1, once all the ribbons 12 are inserted into the plates 20, the housing 16 of the connector 14 is lowered and placed on the topmost plate. The free ends of the ribbons 12 are locked together by ribbons clamp 18. Then, an adhesive or glue is applied on top of the plates inside the housing and the assembly is inserted to a furnace for curing.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. A fiber optic bundle and connector therefor, comprising:
a fiber optic bundle comprising a plurality of optical fibers; and
a connector comprising a first and a second plate, each plate comprising a top and bottom side and a plurality of optical fiber receiving guides, wherein each optical fiber receiving guide comprises a top opening at the top side and a bottom opening at the bottom side;
wherein the first plate is disposed on top of the second plate, the bottom side of the first plate contacting the top side of the second plate;
wherein each optical fiber receiving guide of the first plate is aligned with a corresponding optical fiber receiving guide of the second plate, defining a plurality of stacked optical fiber receiving guides from the top side of the first plate to the bottom side of the second plate for receiving a plurality of optical fibers;
wherein each of the plurality of optical fibers of the fiber bundle is received within one of the stacked optical fiber receiving guides;
wherein a diameter of each of the stacked optical fiber receiving guides is selected to be no more than 3 microns larger than the average fiber diameter within the optical fiber bundle; and
wherein thicknesses of the first and second plates are selected such that the diameter of each of the stacked optical fiber receiving guides is less than one-tenth a full length from the top of the first plate to the bottom of the second plate of a stacked optical fiber receiving guide.

2. The bundle and connector according to claim 1, wherein each said fiber receiving guide is conically shaped, with the top opening of larger diameter than the bottom opening.

3. The bundle and connector according to claim 1, the connector further comprising a chamfer at the top opening of each fiber receiving guide.

4. The bundle and connector according to claim 1, wherein said connector further comprises a housing and a ribbons clamp, said first and second plates being mounted in said housing.

5. The bundle and connector according to claim 1, the connector further comprising a plurality of optical ribbons, each optical ribbon comprising a plurality of optical fibers, the optical fibers in each said optical ribbon being mounted through a row of said optical fiber receiving guides.

6. The bundle and connector according to claim 1, the connector further comprising a third plate comprising a top and bottom side and a plurality of optical fiber receiving guides,
wherein the second plate is disposed on top of the third plate, the bottom side of the second plate contacting the top side of the third plate; and
wherein each optical fiber receiving guide of the third plate is aligned with a corresponding optical fiber receiving guide of the first and second plates.

7. The bundle and connector according to claim 1, wherein the optical fiber receiving guides are arranged in a matrix in said plates.

8. The bundle and connector according to claim 1, wherein at least some optical fibers of the plurality of optical fibers have different diameters.

9. An apparatus for forming the fiber optic bundle and connector of claim 1, wherein the fiber optic bundle comprises a plurality of fiber optic ribbons, each ribbon comprising a row of optical fibers, the apparatus comprising:
a clamp for holding the first and second plates; and
a support device configured to hold a ribbon from the plurality of fiber optic ribbons, to align the row of optical fibers of the held ribbon with a desired row of stacked optical fiber receiving guides in the plurality of stacked optical fiber receiving guides, and to insert the row of optical fibers into the desired row of stacked optical fiber receiving guides substantially simultaneously.

10. An apparatus for forming the fiber optic bundle and connector of claim 1, wherein the fiber optic bundle comprises a plurality of fiber optic ribbons, each ribbon comprising a row of optical fibers, the apparatus comprising:
a clamp for holding the first and second plates; and
a support device configured to hold the plurality of fiber optic ribbons, to align the row of optical fibers of each fiber optic ribbon with a desired row of stacked optical fiber receiving guides in the plurality of stacked optical fiber receiving guides, and to insert each row of optical fibers into the corresponding desired row of stacked optical fiber receiving guides substantially simultaneously.

11. A method for forming the fiber optic bundle and connector according to claim 1, wherein the fiber optic bundle is an optical ribbon comprising a row of optical fibers, the method comprising:
placing the optical ribbon on a support;
aligning the row of optical fibers with a desired row of stacked optical fiber receiving guides in the plurality of stacked optical fiber receiving guides; and
inserting the row of optical fibers into the desired row of fiber receiving guides substantially simultaneously by moving the support.

12. The method according to claim 11, wherein the plates are silicon plates and said optical fiber receiving guides are drilled in said plates by an etching process.

13. A method for forming the fiber optic bundle and connector according to claim 1, wherein the fiber optic bundle comprises a plurality of rows of optical fibers, the method comprising:
placing the optical bundle on a support;
aligning each row of optical fibers with a desired row of stacked optical fiber receiving guides in the plurality of stacked optical fiber receiving guides; and
inserting each row of optical fibers into the corresponding desired row of stacked optical fiber receiving guides substantially simultaneously by moving the support.

14. A fiber optic bundle and connector therefor, comprising:
a fiber optic bundle comprising a plurality of optical fibers;
a connector comprising a plurality of plates, each plate comprising a top and bottom side and a plurality of optical fiber receiving guides, wherein each optical fiber receiving guide comprises a top opening at the top side and a bottom opening at the bottom side; and
each plate disposed on top of another plate, wherein at least one side of each plate is contacting an opposite side of another plate;
wherein each optical fiber receiving guide of each plate is aligned with a corresponding optical fiber receiving guide of another plate, defining a plurality of stacked optical fiber receiving guides from the top side of the outmost disposed top plate to the bottom side of the outmost disposed bottom plate for receiving a plurality of optical fibers;
wherein each of the plurality of optical fibers of the fiber bundle is received within one of the stacked optical fiber receiving guides;
wherein a diameter of each of the stacked optical fiber receiving guides is selected to be no more than 3 microns larger than the average fiber diameter within the optical fiber bundle; and
wherein thicknesses of the plurality of plates are selected such that the diameter of each of the stacked optical fiber receiving guides is less than one-tenth a full length from the top side of the outmost disposed top plate to the bottom side of the outmost disposed bottom plate of a stacked optical fiber receiving guide.

15. The bundle and connector according to claim 14, wherein the plates are silicon plates.

16. The bundle and connector according to claim 14, wherein at least some optical fibers of the plurality of optical fibers have different diameters.

17. An apparatus for forming the fiber optic bundle and connector of claim 14, wherein the fiber optic bundle comprises a plurality of fiber optic ribbons, each ribbon comprising a row of optical fibers, the apparatus comprising:
a clamp for holding the plurality of plates; and
a support device configured to hold the plurality of fiber optic ribbons, to align the row of optical fibers of each fiber optic ribbon with a desired row of stacked optical fiber receiving guides in the plurality of stacked optical fiber receiving guides, and to insert each row of optical fibers into the corresponding desired row of stacked optical fiber receiving guides substantially simultaneously.

18. A method for forming the fiber optic bundle and connector according to claim 14, wherein the fiber optic bundle comprises a plurality of rows of optical fibers, the method comprising:
placing the optical bundle on a support;
aligning each row of optical fibers with a desired row of stacked optical fiber receiving guides in the plurality of stacked optical fiber receiving guides; and
inserting each row of optical fibers into the corresponding desired row of stacked optical fiber receiving guides substantially simultaneously by moving the support.

19. A method for making a connector for a fiber optic bundle, the method comprising:
providing a plurality of plates, each plate comprising a top and bottom side and a plurality of optical fiber receiving guides, wherein each optical fiber receiving guide comprises a top opening at the top side and a bottom opening at the bottom side; and
mounting each plate on top of another plate, wherein at least one side of each plate is contacting an opposite side of another plate;
aligning each optical fiber receiving guide of each plate with a corresponding optical fiber receiving guide of another plate, defining a plurality of stacked optical fiber receiving guides from the top side of the outmost disposed top plate to the bottom side of the outmost disposed bottom plate for receiving a plurality of optical fibers; and
receiving each of a plurality of fiber optic threads of a fiber bundle in one of the plurality of stacked optical fiber receiving guides;
wherein the total thickness through all of the stacked plates is selected such that a diameter of each of the stacked optical fiber receiving guides is less than one-tenth a total opening length from the top side of the outmost disposed top plate to the bottom side of the outmost disposed bottom plate.

20. The method according to claim 19, wherein the plates are silicon plates and said optical fiber receiving guides are drilled in said plates by an etching process.

21. The method according to claim 19, wherein at least some fiber optic threads of the plurality of fiber optic threads have different diameters.

22. The method according to claim 19, wherein the plurality of fiber optic threads comprises a plurality of fiber optic ribbons, each ribbon comprising a row of fiber optic threads, and wherein the receiving of each of the plurality of fiber optic threads in one of the plurality of stacked optical fiber receiving guides occurs substantially simultaneously.

* * * * *